US006209005B1

(12) United States Patent
Harker et al.

(10) Patent No.: US 6,209,005 B1
(45) Date of Patent: *Mar. 27, 2001

(54) METHOD AND APPARATUS FOR GENERATING AND LINKING DOCUMENTS TO CONTACTS IN AN ORGANIZER

(75) Inventors: James Riddle Harker, San Jose; Dominic Philip Haine, San Francisco, both of CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/780,052

(22) Filed: Dec. 23, 1996

(51) Int. Cl.[7] .............................. G06F 7/14; G06F 17/24
(52) U.S. Cl. ............................................. 707/501
(58) Field of Search .............................. 407/501

(56) References Cited

U.S. PATENT DOCUMENTS

| 5,222,236 | * | 6/1993 | Potash et al. ........................ 707/102 |
| 5,267,155 | * | 11/1993 | Buchanan et al. ................... 707/540 |
| 5,341,293 | * | 8/1994 | Vertelney et al. .................... 345/326 |
| 5,579,467 | * | 11/1996 | Capps ................................... 707/507 |
| 5,628,004 | * | 5/1997 | Gormley et al. ...................... 707/104 |
| 5,696,906 | * | 12/1997 | Peters et al. ........................... 705/34 |
| 5,729,730 | * | 3/1998 | Wlaschin et al. ........................ 707/3 |
| 5,737,726 | * | 4/1998 | Cameron et al. ........................ 707/1 |
| 5,802,534 | * | 9/1998 | Hatayama et al. .................... 707/530 |
| 5,813,006 | * | 9/1998 | Polnerow et al. ...................... 707/10 |
| 5,826,263 | * | 10/1998 | Nakabayashi et al. ................. 707/7 |
| 5,832,488 | * | 11/1998 | Eberhardt ............................... 707/10 |
| 5,845,276 | * | 12/1998 | Emerson et al. ........................ 707/2 |
| 5,870,739 | * | 2/1999 | Davis, III et al. ....................... 707/4 |
| 6,088,717 | * | 7/2000 | Reed et al. ............................. 707/10 |

OTHER PUBLICATIONS

Microsoft Press. "Computer Dictionary: Second Edition", Redmond: Microsoft Corp., pp. 14 and 350, Dec. 1993.*
Wong, William, "Internet on a Budget", CommunicationsWeek, n. 601, pp. s25–s26, Mar. 1996.*
Yakal, Kathy., "Action Plus for Windows", PC Magazine, v. 15, n. 8, pp. 168–169, Apr. 1996.*
Broida, Rick, "Janna Contact95", Home Office Computing, v. 14, n. 8, p. 88, Aug. 1996.*
Patz, Joel T., "Get in the Act", Home Office Computing, v. 14, n. 10, pp. 34–35, Oct. 1996.*
Broida, Rick, "Organizer Goes Online", PC Magazine, v. 15, n. 21, p. 76, Dec. 1996.*
Brenesal, Barry, So Many PIMs, So Little Time:, Windows Sources, v. 4, n. 12, pp. 96–97, Dec. 1996.*
Polito, Julie. "In Touch and On Time", PC/Computing, v. 9, n. 12, p. 132, Dec. 1996.*
Ace, Mark et al. "Now Up To Date Version 3.5 Users Guide", published by Now Software, Inc., Portland, Oregon, pp. 1–229, Dec. 1995.*
Mark D. Holcomb, Patrick McDougall, and John T. Sarr, "Now Up–to–Date User's Guide," Now Software, Inc., Portland, OR, 1992–94, pp. 125–132, Jan. 1994.

* cited by examiner

Primary Examiner—Mark R. Powell
Assistant Examiner—Jeffrey Allen Rossi
(74) Attorney, Agent, or Firm—Beyer Weaver & Thomas, LLP

(57) ABSTRACT

Disclosed are methods and apparatuses for attaching a letter to a contact in an organizer contact list. The method includes the operations of selecting a contact from the organizer contact list that is controlled by an organizer program. The method then stores a plurality of identifying information associated with the selected contact into a temporary memory location. Next, a letter is selected from a plurality of standard letters provided by the organizer. The plurality of identifying information associated with the selected contact is then integrated into the selected letter.

13 Claims, 17 Drawing Sheets

Apology Letter Template (WP) — 286

11/7/96

Thank you for calling my attention to the unsatisfactory experience you had with one of our employees.

Please accept my sincerest apologies for this regrettable incident. We acknowledge full responsibility for the actions of our employees; yet, I want to assure you that the situation you described was in no way typical of how Company treats valued customers such as yourself. I have personally spoken with the individual involved. He/She realizes His/Her mistake and understands that such behavior will not be tolerated.

Again, my deepest apologies. We appreciate your business and hope you will continue to patronize Company. I guarantee you will receive the respectful and competent service you deserve.

Sincerely,

Name
Title

— 330

To personalize a letter template:
1. Read all the instructions in this note or print it out first. You will need to delete the note before completing the instructions.
2. Move the text in the template so that it does not overlap with items on your letterhead. This may require a trial printout or two.
3. In the letter template, replace all bold entries with your own information. Change the bold items back to the Plain Text style.
4. Make any other changes you want in the letter template.
5. Delete the yellow note titled "To personalize a letter template:".
6. Place the cursor at the place in the letter where the recipients name and address should go, as if you were going to type the address yourself.
7. Close and save the letter template.

Fig. 10

Apology Letter to Dennis (WP)

Bakery Town Company
123 Main Street
Small Town, California 95000
(406) 555-1234

11/7/96

Mr. Dennis Copley Ph.D.
Senior Research Scientist
International Bakery
Research and Development
1120 West Park Road
Bldg. A
Wichita, KS 67890
USA Dear Mr. Dennis Copley Ph.D., Thank you for calling my attention to the unsatisfactory experience you had with one of our employees.

Please accept my sincerest apologies for this regrettable incident. We acknowledge full responsibility for the actions of our employees; yet, I want to assure you that the situation you described was in no way typical of how Bakery Town Co. treats valued customers such as yourself. I have personally spoken with the individual involved. He realizes His mistake and understands that such behavior will not be tolerated.

Again, my deepest apologies. We appreciate your business and hope you will continue to patronize Bakery Town Co. I guarantee you will receive the respectful and competent service you deserve.

Sincerely,

Bob A. Smith
Bakery Town Co. President

Fig. 15

METHOD AND APPARATUS FOR GENERATING AND LINKING DOCUMENTS TO CONTACTS IN AN ORGANIZER

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to personal organizers, and more particularly, to methods and apparatuses for efficiently generating and linking documents to contacts of a personal organizer.

2. Description of the Related Art

As people's personal and business schedules have come to be more complicated, more and more people have come to rely on personal organizer programs. Generally speaking, personal organizers assist users in keeping track of events though the use of calendars that may be displayed in any number of suitable viewing formats (i.e., daily, weekly, monthly and yearly). As appreciated by those who use personal organizers, managing busy home and business events is made much more efficient when an organizer's full potential is utilized. By way of example, a user may set organizer tickler alarms which alert the user of upcoming "to-do" tasks, meetings and events.

Most organizers are also equipped with capabilities for storing and keeping track of a user's personal and business contacts. Typically, a contact's information may include the contact's name, business title, work address, home address, work telephone number, and home telephone number. The user's contacts are typically arranged in columns for easy viewing and access. Although organizers do a superb job at organizing events and contacts, many users tend to expend a great deal of time and effort corresponding with their contacts.

By way of example, some business users correspond with numerous supplier contacts, distributor contacts, buyer contacts and employee contacts on a daily basis. Preparing such correspondences typically requires: (1) locating the contact's information stored in the user's organizer contact list; (2) copying the contact's full name and title; (3) selecting and copying the contact's appropriate address; (4) locating and launching the user's word processor; (5) formatting the user's return address; (6) filling in the contacts name, title, and address; (7) preparing a standard response in the body of the letter; and (8) inputting the user's signature block. As can be appreciated, responding to daily correspondence can be a very time consuming task, especially when a majority of responses are standard boilerplate type responses.

A further organizational problem associated with corresponding with contacts is keeping track of whether appropriate responses have been forwarded to selected contacts. That is, although a user's organizer is able to keep a detailed compilation of each contact's identifying information (i.e., address, phone numbers, and e-mail), the user is generally unable to ascertain (with any reasonable efficiency) whether appropriate correspondences have been prepared and sent to each contact.

Conventionally, when a user needs to verify that one of its contacts received an appropriate response, the user will unfortunately be forced to search through computer directories in an attempt to identify documents having titles that somewhat resemble a response the contact. To verify that a selected document is indeed the correct document, the user will then be required to launch a word processor to view the document. If the selected document is not the correct response, the user will once again perform a search through the computer directory and re-launch the word processor. Consequently, the user is unable to time efficiently determine whether responses have been prepared to selected contacts, and if responses were prepared, locating the appropriate response document is time consuming and wasteful.

In view of the foregoing, what is needed are methods and apparatuses for efficiently generating a letter to a selected contact of an organizer program, and linking the generated letter to the selected contact. Further, there is a need for an organizer program that facilitate the generation of standard response letters directly from the organizer program.

SUMMARY OF THE INVENTION

Broadly speaking, the present invention fills these needs by providing methods and apparatuses for attaching a letter to a contact of an organizer, and providing a link to the attached letter from the organizer. It should be appreciated that the present invention can be implemented in numerous ways, including as a process, an apparatus, a system, a device, a method, or a computer readable medium. Several inventive embodiments of the present invention are described below.

In one embodiment of the present invention, a user of an organizer program that has a plurality of contacts can efficiently prepare correspondences to a particular contact by selecting an attach feature from the contact's identification card. After the attach feature is selected, the user is provided with an option of using a previously personalized letter, or preparing a letter that is personalized to the user needs. Once the user selects the appropriate letter, the organizer program advantageously integrates the contacts name, address and greeting into the selected letter. The selected letter is preferably generated using a word processor selected by the user at the time of selecting the letter.

Advantageously, the organizer program can efficiently use the word processing power of a dedicated word processing program. The generated letter is also conveniently linked to the appropriate contact listed in the organizer program. This provides the user with the ability to quickly reference a contact's reference card to determine whether particular correspondences have been prepared to the contact. Further, if correspondence was prepared, the user efficiently links to the appropriate document file from the organizer program to open the document.

In another embodiment, a method for attaching a letter to a contact in an organizer contact list is disclosed. The method includes the operations of selecting a contact from the organizer contact list that is controlled by an organizer program. The method then stores a plurality of identifying information associated with the selected contact into a temporary memory location. Next, a letter is selected from a plurality of standard letters provided by the organizer. The plurality of identifying information associated with the selected contact is then integrated into the selected letter.

In yet another embodiment, a method for linking a letter to a contact is disclosed. The method includes the operations of generating a letter having a selected address type copied from data fields of a selected contact of an organizer contact list that includes a plurality of contacts. Each of the plurality of contacts preferably have a plurality of address types, and the letter is generated by a separate word processor program that is called by an organizer program containing the organizer contact list. The method then saves the letter having the selected address type using the separate word processor. The word processor is previously configured to get a file reference for the saved letter and provides the file reference to the organizer program. The organizer program then generates a file alias for the file reference. The file alias is preferably associated with the selected contact of the organizer contact list. An attachment symbol is further provided on the data fields of the selected contact of the organizer contact list. The attachment symbol configured to indicate the number of attachments associated with the selected contact, and the generated letter being at least one of the number of attachments. The number of attachments advantageously provide a link to the number of attachments associated with the contact.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 10 illustrates an exemplary personalization operation of the selected apology letter template in accordance with one embodiment of the present invention.

FIG. 15 shows the exemplary apology letter having the appropriate integrated data in accordance with one embodiment of the present invention.

DETAILED DESCRIPTION OF THE PREFERRED EMBODIMENTS

The present invention discloses methods and apparatuses for attaching a letter to a contact in an organizer contact list. In one embodiment of the present invention, a user of an organizer program having a plurality of contacts can efficiently prepare correspondences to a particular contact by selecting an attach feature from the contact's identification card. After the attach feature is selected, the user is provided with an option of using a previously personalized letter, or preparing a personalized letter to the user. Once the user selects the appropriate letter, the organizer program advantageously integrates the contacts name, address and greeting into the selected letter. The selected letter is preferably generated using a word processor selected by the user at the time of selecting the letter. In this manner, the organizer program efficiently uses the word processing power of a dedicated word processing program. The generated letter is also conveniently linked to the appropriate contact listed in the organizer program. In this manner, a user can identify the number and types of letters sent to each contact, and can select and open the listed letter documents directly from the organizer program.

Figure 1:
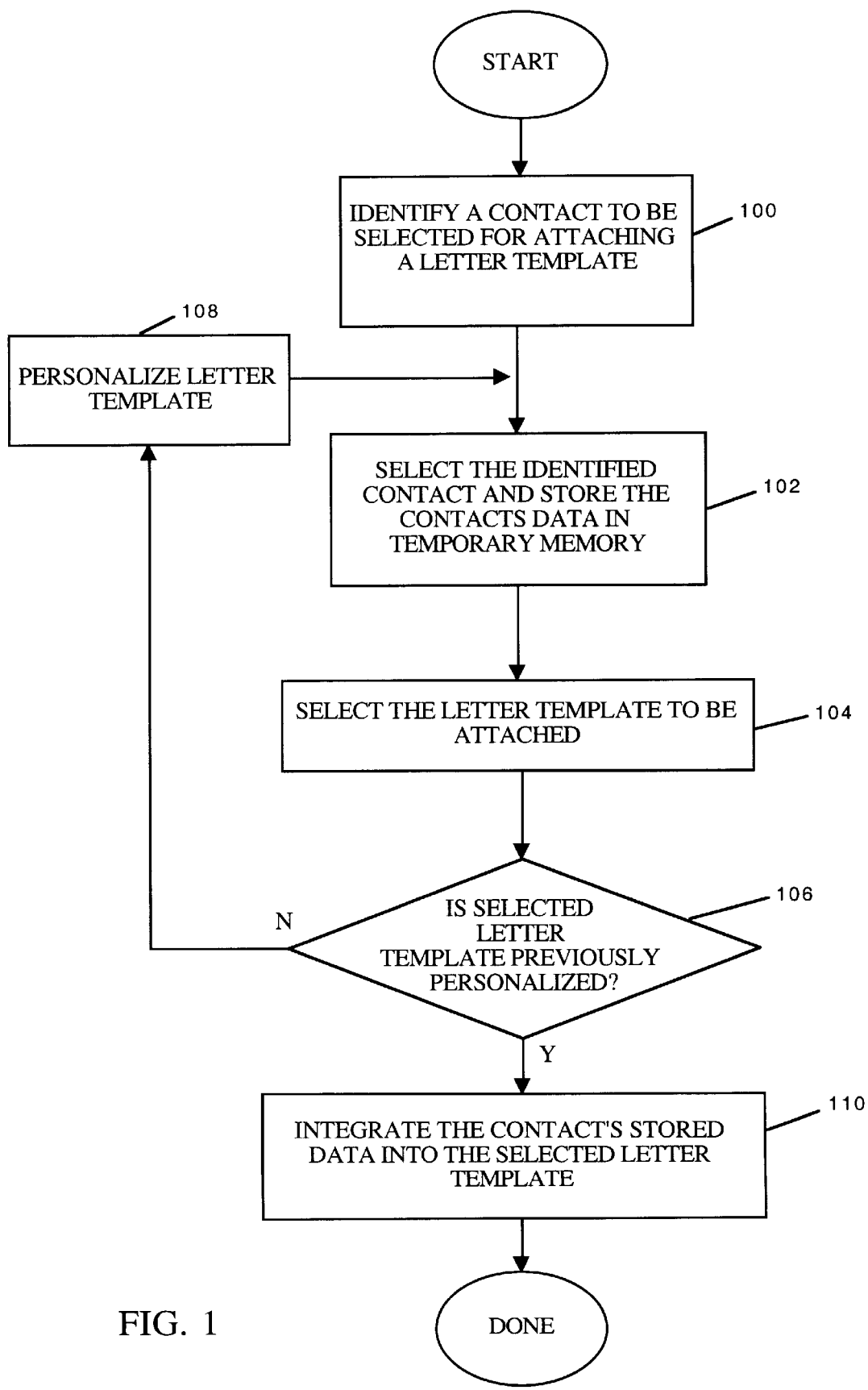
FIG. 1 is an overview flowchart illustrating the method operations associated with attaching a letter in accordance with one embodiment of the present invention.

FIG. 1 is an overview flowchart illustrating the method operations associated with attaching a letter to a contact of an organizer program in accordance with one embodiment of the present invention. The method begins at an operation 100 where a contact is identified from a list of contacts contained in an organizer program. Once the contact is identified for which a letter template needs to be attached, the method will proceed to an operation 102 where the identified contact is selected. The selected contact's identifying information which may include the contact's full name, business title, business name and address is stored into temporary memory. By way of example, temporary memory may include a computer's cache memory, a hard drive, a disk drive, a networked memory unit, or a computer's operating system clipboard-type memory used for temporarily storing data.

Once the contact has been identified in operation 102, the method proceeds to an operation 104 where a letter template to be attached to the selected contact is selected. By way of example, the letter template may be a standard boilerplate-type letter such as an apology letter, a recommendation letter, an employment offer letter, a referral letter, and a sales follow-up letter. However, it should be understood that these letters are merely exemplary, and the user may create or modify the user's own letter templates that are specifically suited to the user's personal and business communications.

Once the appropriate letter template is selected in operation 104, the method proceeds to a decision operation 106 where it is determined whether the selected letter template has been previously personalized.

If it is determined that the selected letter template has not been previously personalized, the method will proceed to an operation 108 where the user may personalize the letter template to include personal identification information. By way of example, such personalization may include adding the user's return address, adding the user's standard letterhead, adding the user's signature block, and modifying the body of the letter.

Once the letter template has been personalized in operation 108, the method again proceeds through operation steps 102 and 104, leading to decision operation 106 where it is once again determined whether the selected letter template has been previously personalized. If the selected letter template has been previously personalized, the method will proceed to an operation 110 where the contact data stored in temporary memory, as described in operation 102, is integrated into the selected letter template. In this embodiment, the contact's stored data is preferably inserted into a predefined location of the letter template, e.g., such as the address block location and greeting location of the letter template. Once the contact's data is integrated into the selected letter template, the method for attaching a letter template to a selected contact is done.

Figure 2:
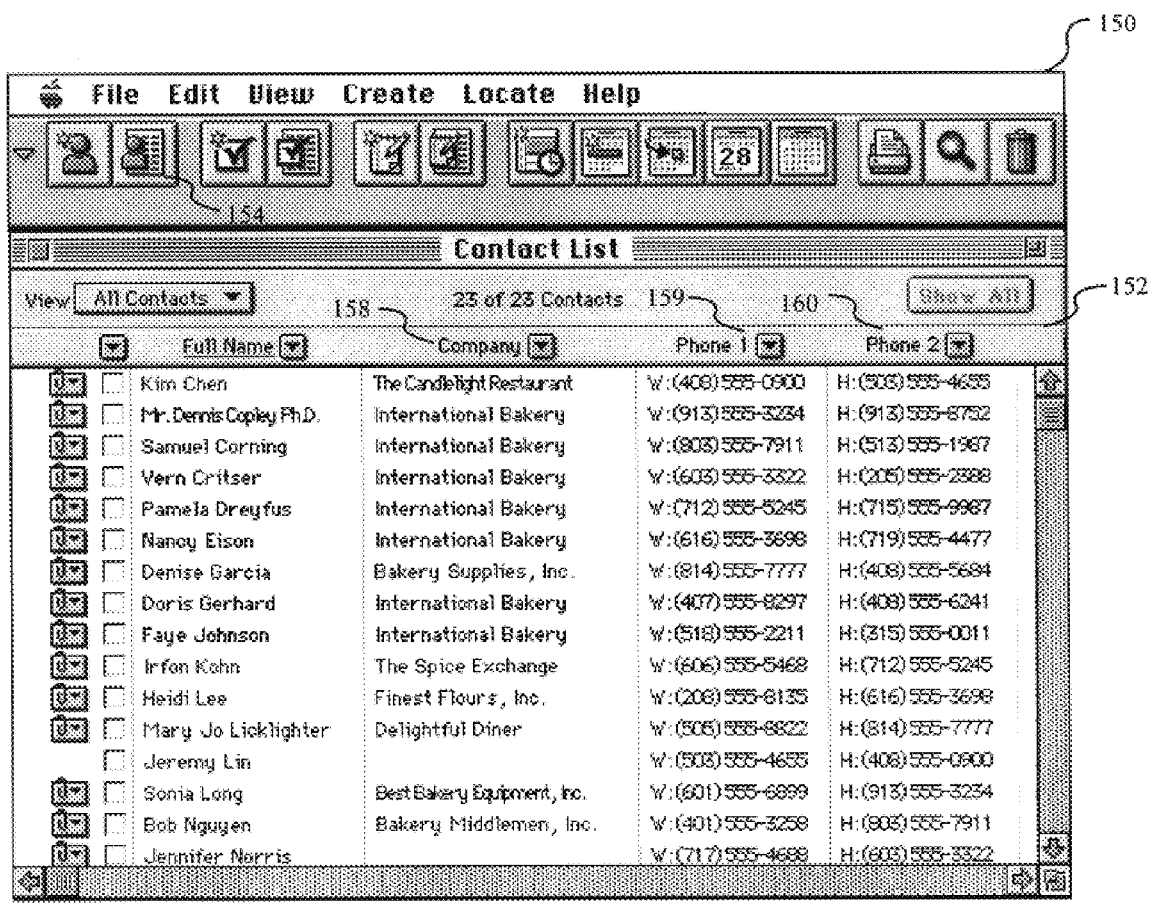
FIG. 2 is a graphical user interface representation of a plurality of contacts stored within an organizer program in accordance with one embodiment of the present invention.

FIG. 2 is a graphical user interface representation of a plurality of contacts stored within an organizer program 150 in accordance with one embodiment of the present invention. As shown, organizer program 150 includes several functions icons for executing a variety of functional associated with the organizer program 150. For example, upon selecting an icon 154, the organizer program 150 will preferably provide the plurality of contacts identified in a contact list 152. Accordingly, contact list 152 itemizes the contacts in alphabetical order by last name, and each of the listed contacts have their associated company information 158, phone numbers 159, 160 and other suitable information which may be viewed by scrolling along the view window of contact list 152.

By way of example, the first exemplary contact is Kim Chen, and her company information 158 is listed as "The Candlelight Restaurant," her first phone number 159 is listed as "(408) 555-0900," her second phone number 160 is listed as "(503) 555-4655." As mentioned above, each contact may have additional identifying information which may identify Kim Chen as an employee, a supplier, a personal friend, or family member. In addition, Kim Chen's e-mail address, birth date, etc. may be incorporated as part of her identifying information.

Figure 3:
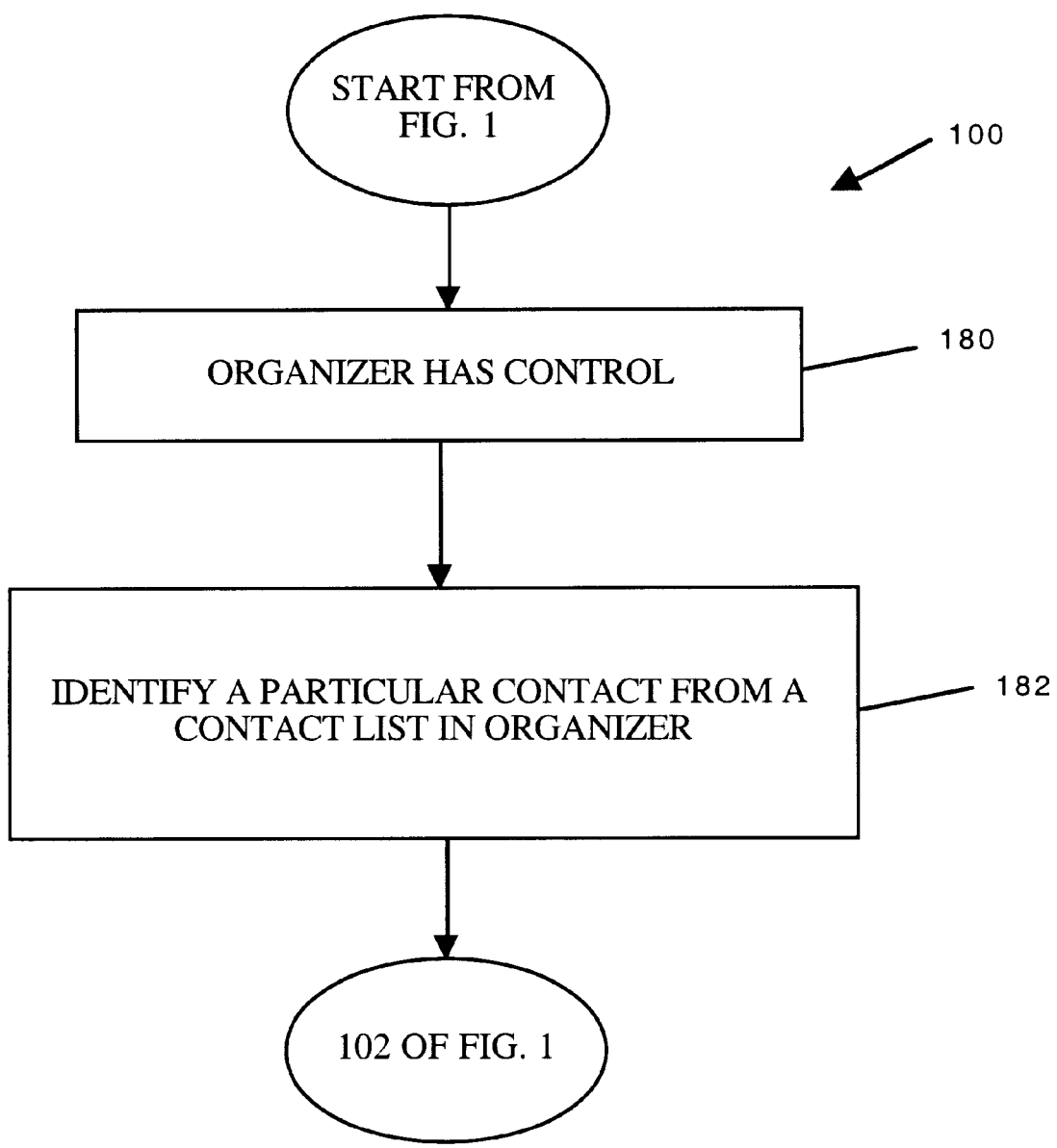
FIG. 3 is a flowchart diagram illustrating the method operations associated with selecting a particular contact in accordance with a preferred embodiment of the invention.
Figure 4:
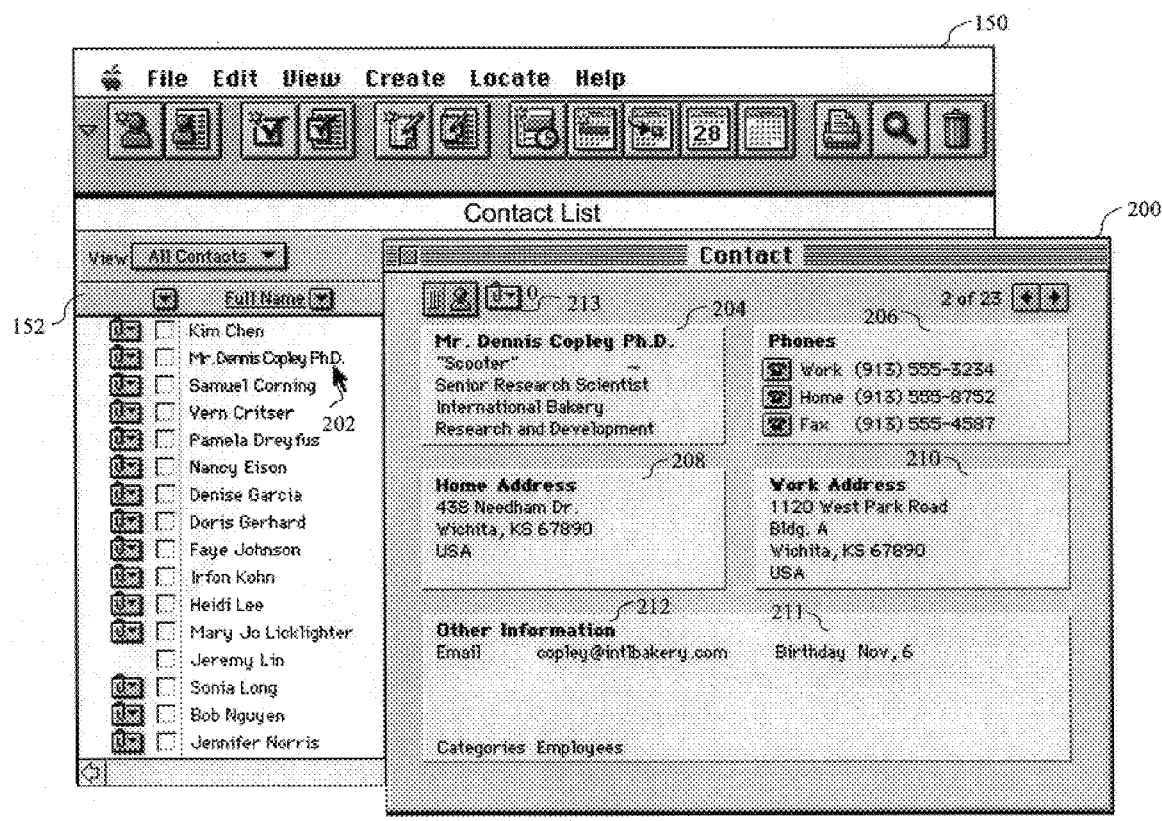
FIG. 4 shows an exemplary selection of a particular contact in accordance with a preferred embodiment of the invention.

As described in FIG. 1, a user desiring to send a standard letter to one of its various contacts identified in contact list 152, may efficiently generate a standard letter by initially selecting the particular contact in contact list 152 which brings up a detailed contact card for the selected contact. For example, FIG. 3 is a flowchart diagram illustrating the method operations associated with selecting a particular contact, and FIG. 4 shows an exemplary selection of a contact. In operation 180, the organizer program 150 has control, and the user may be viewing a window similar to that shown in FIG. 2 which is preferably generated by organizer program 150. The method then proceeds to an operation 182 where a particular contact is identified from the contact list in the organizer 150. As shown in FIG. 4, a contact may be selected by placing a pointer 202 over a particular contact and choosing the contact. In this example, the user selected a contact named "Mr. Dennis Copley, Ph.D.".

Once Mr. Copley's contact is selected using pointer 202, a contact data card 200 is displayed listing Mr. Copley's identifying information. For illustration purposes, Mr. Copley's identifying information may include his name, title, company, position, and his nick-name "Scooter" 204. Other information may include Mr. Copley's: (a) phone numbers 206 for contacting Mr. Copley via telephone user interface icons; (b) home address 208; (c) work address 210; (d) e-mail address 212; and (e) birthdate 211. Of course, it should be understood that any other suitable kind or type of information may be included as part of Mr. Copley's contact data card 200 which generally depends on the particular contact.

A particular advantageous feature is an attachment icon 213 that is displayed as part of data contact card 200. In this embodiment, attachment icon is viewed as a graphical user interface having a paper clip design. The attachment icon 213 generally provides the user with instant information on the number and types of documents that have been sent to Mr. Copley in the past. As shown, attachment icon 213 indicates that there are zero "0" attachments. However, if there had been previous attachments, the number of attachments may have been appropriately listed for the user's review, selection and retrieval. Consequently, to determine the type of documents attached to the contact, the user may easily select the icon having a pop-up type selection function which optionally links the selected contact to the previously attached documents.

Figure 5:
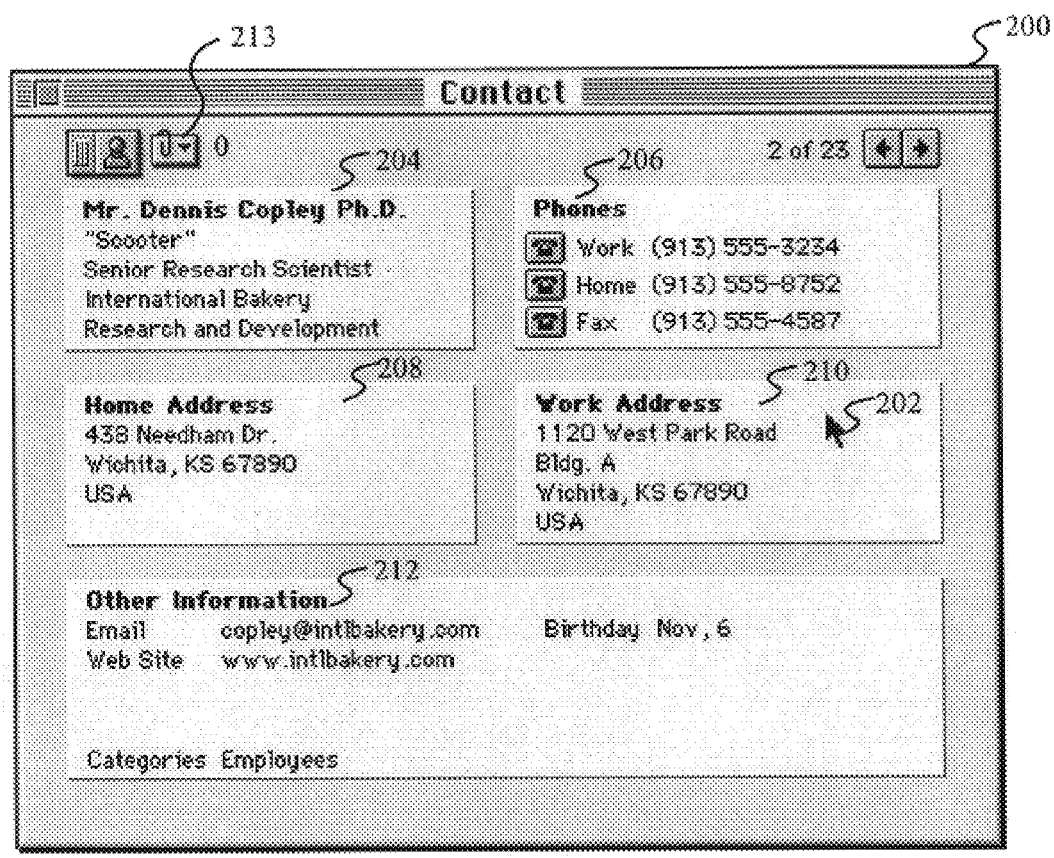
FIG. 5 shows an exemplary selection of a particular address for the selected contact in accordance with a preferred embodiment of the invention.
Figure 6:
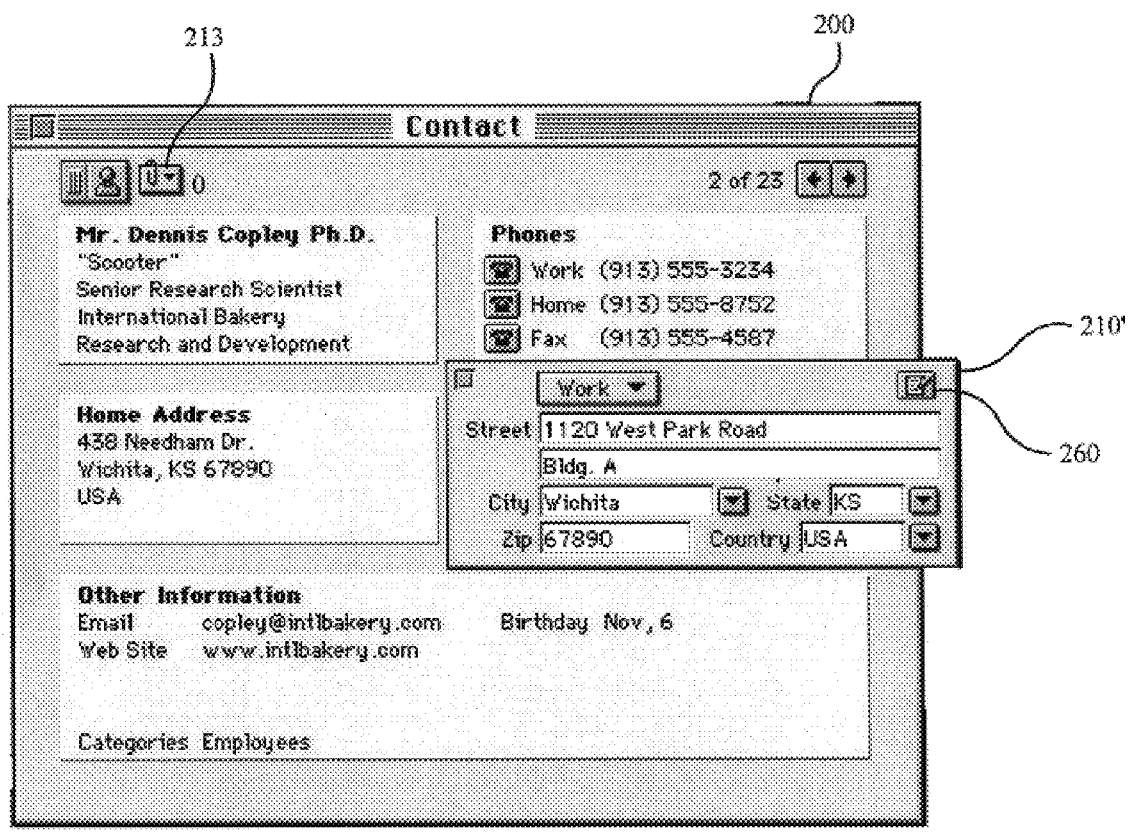
FIG. 6 shows an address editing window for the selected address and an associated attach letter icon in accordance with one embodiment of the present invention.

Reference is now drawn to FIG. 5 where pointer 202 is used to select work address 210 of contact card 200. The user may select work address 210 by clicking the mouse once pointer 202 is placed substantially over work address 210, and a window 210' for work address 210 is presented to the user as shown in FIG. 6. Although selection is specifically described as being a mechanical-type clicking action (e.g., clicking or double-clicking on a computer mouse), alternative selection techniques may be used, such as, employing a touch screen or simply using an input keypad.

Window 210' preferably makes the address fields of work address 210 accessible for modifications so identifying information for the contact Mr. Copley may be updated on the fly. Further, window 210' provides an attach letter icon 260 that the user may select to send Mr. Copley a letter. Of course, if a letter is prepared for Mr. Copley using the attach letter icon 260, the prepared letter will be identified in the attachment icon 213 of contact data card 200, and a link is established to the prepared letter. In this manner, if the user wants to see what correspondence had been sent to Mr. Copley, the user could simply select the appropriate correspondence letter sent to Mr. Copley. By selecting the letter, the organizer program 150 automatically opens the letter created by a predefined word processor program.

Figure 7:
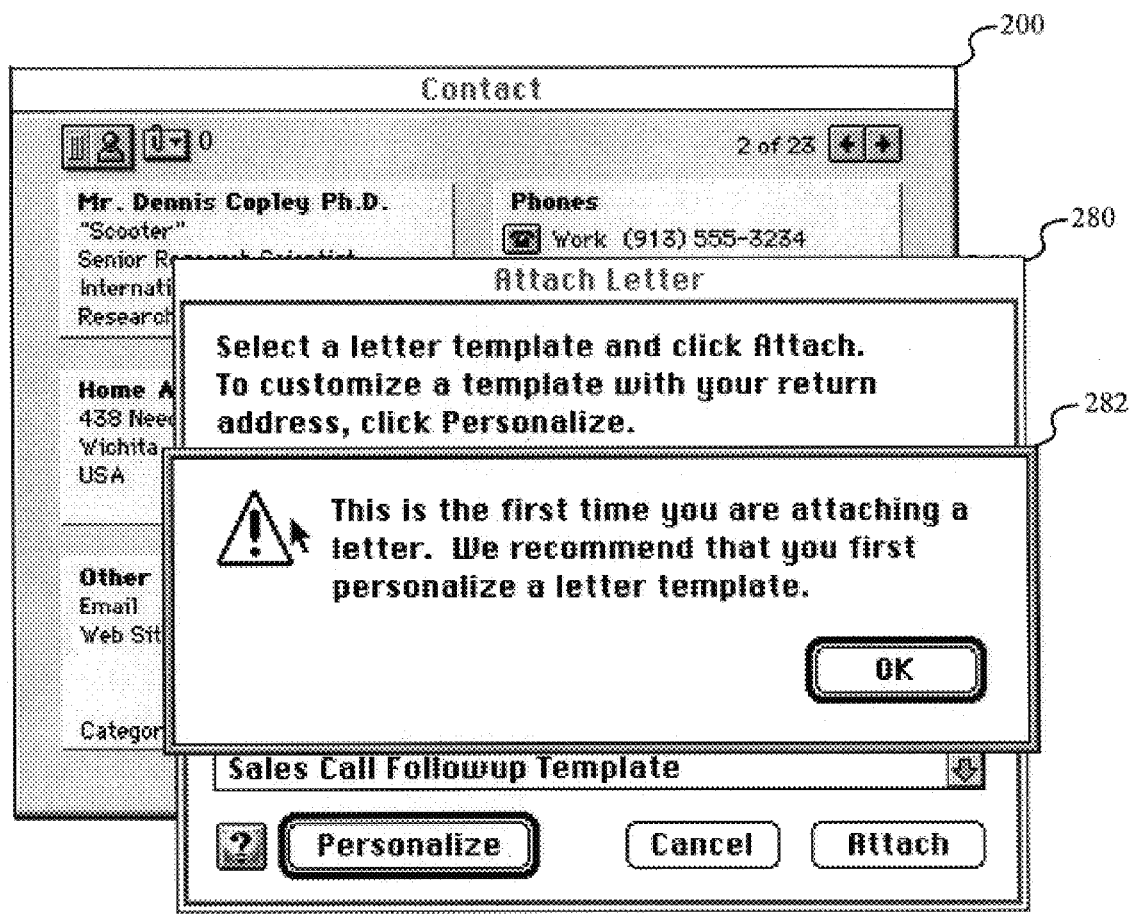
FIG. 7 shows a warning dialog that is presented to a user the first time the attach letter icon of FIG. 6 is selected in accordance with one embodiment of the present invention.

FIG. 7 shows a warning dialog 282 that is preferably presented to the user the first time the attach letter icon 260 is selected. In this manner, the user is reminded that personalization of any standard letter template is preferred. By way of example, the warning dialog states "This is the first time you are attaching a letter. We recommend that you first personalize a letter template." This is especially useful when standard letter templates are provided as part of the organizer program 150. Although standard letter templates provide useful boilerplate data, modification of the boilerplate data is recommended so that it is personalized for the user's particular home or business use.

In an alternative embodiment, a warning dialog can be linked to each of the provided letter templates to remind the user of the need to personalize the letter templates on a letter-by-letter basis. In this manner, organizer program 150 keeps track of which letters have been previously personalized, and provides a warning only for those letter templates that have never been personalized.

Figure 8:
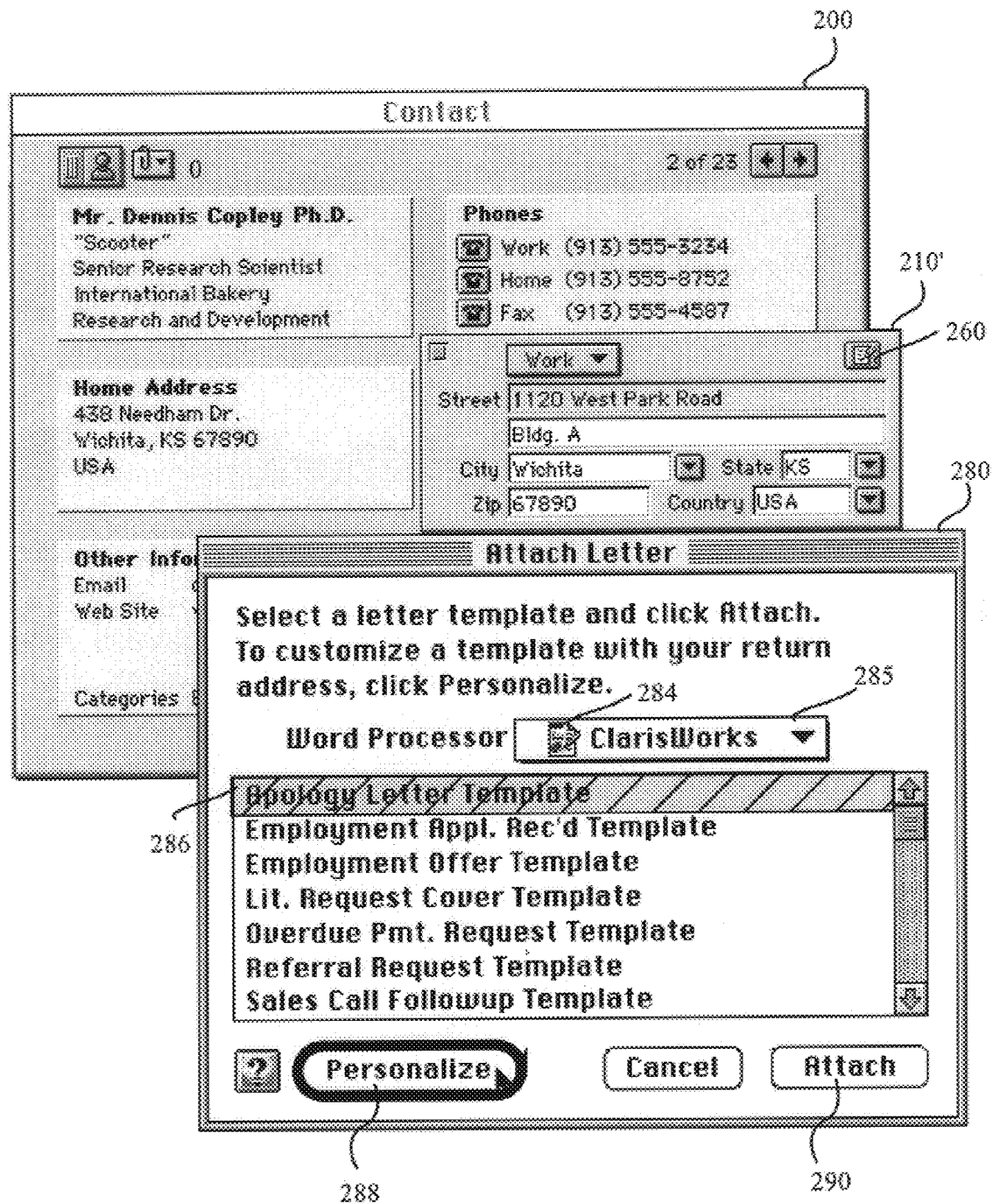
FIG. 8 shows an attach letter window used for selecting a standard letter template and appropriate word processor in accordance with one embodiment of the present invention.

Once the user acknowledges that personalization of a letter template is required in FIG. 7 by clicking the "OK" icon, an attach letter window 280 is presented to the user for selecting a standard letter template and selecting an appropriate word processor as shown in FIG. 8. The attach letter window 280 generally prompts the user to select a letter template and click personalize 288 or attach 290. Of course, if the user has not yet personalized a particular letter template, the user should first personalize the selected letter template before clicking attach 290. As will be described in greater detail below, attaching a letter essentially pastes the contacts identifying information onto the appropriate location of the selected letter template.

In this example, an apology letter template 286 is selected by the user, and an appropriate word processor 284 is selected for opening apology letter template 286. It should be understood that any suitable word processor may be selected for opening a selected letter template by choosing the appropriate word processor from a pull-down menu icon 285. When both an appropriate word processor and letter template is selected, the user may select the personalized 288 button by placing pointer 202 over the personalized 288 button and clicking on the mouse.

It should be noted that attach letter window 280 automatically prompts the user to personalize apology letter template 286 since it has not already been personalized. Advantageously, this is accomplished having organizer program 150 default to personalized 288 button (e.g., personalized 288 button has a highlighted ring shading, and may be activated by a simple "return" key stroke), while leaving attach 290 icon unhighlighted.

Figure 9:
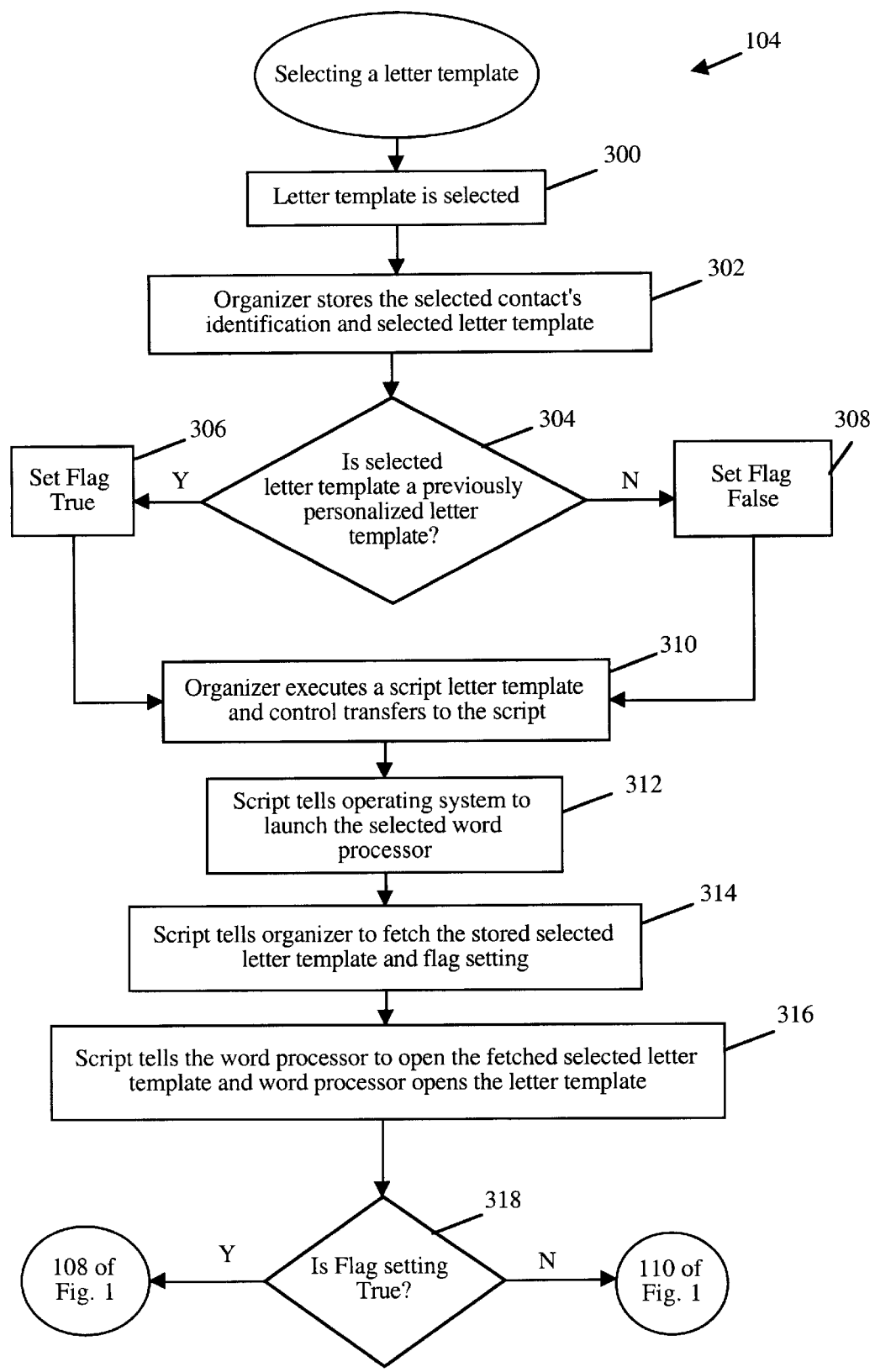
FIG. 9 shows a flowchart diagram illustrating the method operations associated with selecting a letter template in accordance with one embodiment of the present invention.

FIG. 9 shows a flowchart diagram illustrating the method operations associated with selecting a letter template in accordance with one embodiment of the present invention. The method begins at an operation 300 where a letter template is selected from attach letter window 280 of FIG. 8 (i.e., apology letter template 286). As described above, because apology letter template 286 has not been previously personalized, personalize 288 button has a highlighted ring. Once a letter template is selected in operation 300, the method proceeds to an operation 302 where organizer program 150 stores the selected contact's identification and a reference to the selected letter template. In this manner, the organizer can store a pointer to the location of the letter template so that it may be recalled when the attachment operation is performed, and the contact's identification reference is also stored (e.g., Mr. Copley's contact data card reference). Preferably, the reference is stored in a global variable which provides an efficient method for subsequent retrieval in future operations.

Once the organizer stores the select contact's identification and selected letter template reference in operation 302, the method proceeds to a decision operation 304 where it is determined whether the selected letter template is a previously personalized letter template. If it is determined that the selected letter template has not been previously personalized, the method will proceed to an operation 308 where a flag is set to "false." On the other hand, if it is determined that the selected letter template was previously personalized, the method will proceed to an operation 306 where the flag is set to "true." Once the appropriate flag setting has been established in operations 308 and 306, the method will proceed to an operation 310 where the organizer executes a script for attaching the selected letter template, and control transfers to the script.

In this embodiment, a script is a sub-program configured to interact with the organizer program 150, the computer's operating system, and associated word processors that may be installed on a local or networked computer system. It should be understood that a script program is preferably implemented to more efficiently allow for future improvements and functionalities. Advantageously, only the script needs to be modified in future updates. Thus, the organizer program does not have to be re-released (at a large expense) as a new version each time an improvement is made. Accordingly, the functionalities performed by the script sub-program may alternatively be performed by the organizer program 150 itself.

Once the script has control in operation 310, the method proceeds to an operation 312 where the script tells an operating system to launch the selected word processor. In this manner, the operating system is able to locate the selected word processor and appropriately launch the program for the selected letter template. Although one embodiment of this invention implements an operating system to locate the appropriate word processor program, the operating system may also efficiently perform implementing a suitable operating system capable of launching a selected word processor in response to the script request.

In the example shown in FIG. 8, the selected word processor is a "ClarisWorks™" word processor available from Claris Corporation of Santa Clara, Calif. However, it should be understood that the selected word processor may be any suitable available word processor capable of incorporating text, graphics and spread sheet documents. Once the selected word processor has been launched in operation 312, the method will proceed to an operation 314 where the script tells the organizer to fetch the stored letter template and appropriate flag setting from the aforementioned global.

The method will then proceed to an operation 316 where the script tells the selected word processor to open the fetched letter template and the word processor opens the letter template selected in operation 300. The method now proceeds to a decision step 318 where it is determined whether the flag setting is true. If the flag setting is determined to be true, the method will proceed to operation 108 of FIG. 1 where the letter template is personalized in accordance with the user's requirements. On the other hand, if the flag setting is not true, the method will proceed to an operation 110 of FIG. 1 where the contact's identifying information (i.e., name, title, address and greeting ) is integrated into the selected letter template.

FIG. 10 illustrates an exemplary personalization of the selected apology letter template 286 in accordance with one embodiment of the present invention. To assist the user in personalizing the apology letter template 286, a sticky note 330 is displayed along with the boilerplate language of apology letter template 286. The sticky note 330 provides the user with suggestions for personalizing the letter template to meet the user's needs. By way of example, the user may personalize the letter template by inserting its own letterhead, inserting its own signature block, and personalizing the boilerplate language. However, it should be understood that the provided letter templates are merely exemplary templates, and the user may draft its own personalized letter templates from scratch. In this manner, the user may include personalized information for assisting the user with its business or personal communications.

Figure 11:
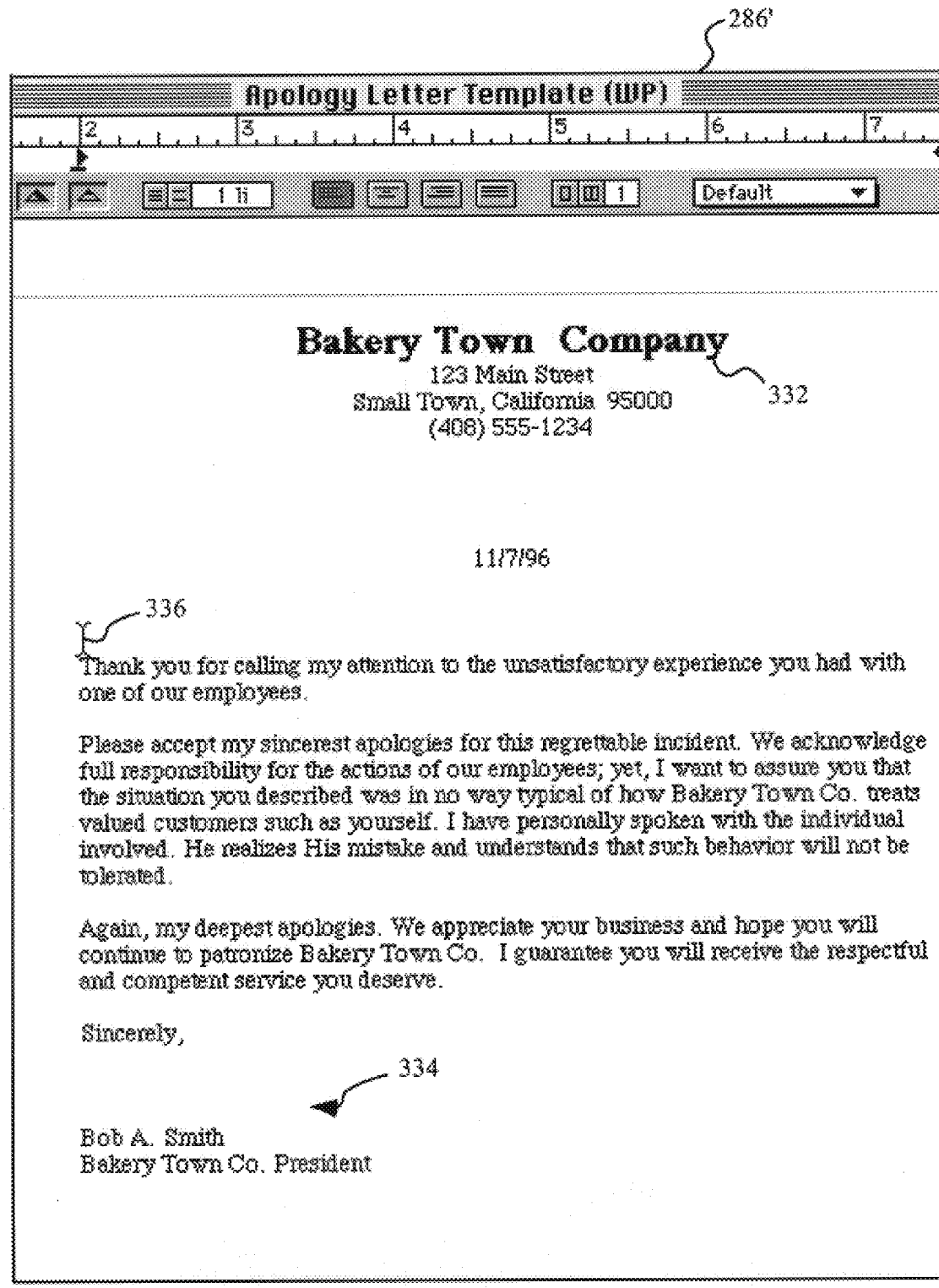
FIG. 11 is an exemplary apology letter template that has been personalized in accordance with one embodiment of the present invention.

FIG. 11 is an apology letter template 286' which has been personalized in accordance with a user's needs. In this example, the user is Bob A. Smith of Bakerytown Company, Small Town, Calif. As shown in a signature block 334, Mr. Smith's title, and a letterhead 332 have been included to appropriately personalize the apology letter template 286 of FIG. 10 to Mr. Smith's needs. Although Mr. Smith could have written a completely new apology letter template, in this example, Mr. Smith chose to edit the apology letter template 286 in accordance with the instructions provided in sticky note 330 of FIG. 10.

Once the letter has been personalized, the user should place a cursor 336 where the contact's (i.e., Mr. Copley's information) identifying information is to be integrated into apology letter template 286'. By way of example, cursor 336 has been placed above the body of the apology letter template 286'; however, the user may integrate the contact's identifying information in any suitable location within a given letter template.

Figure 12:
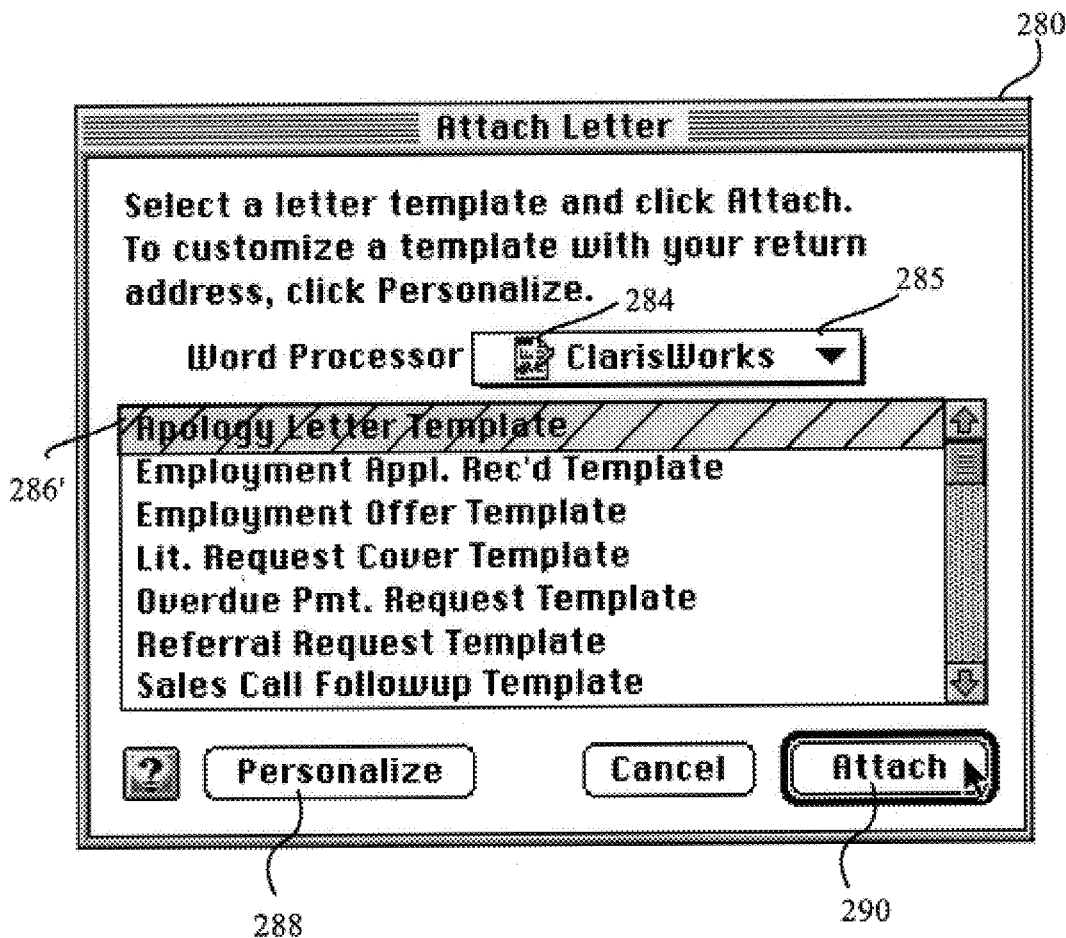
FIG. 12 shows a selection window for selected a previously personalized apology letter template in accordance with one embodiment of the present invention.

Once the user "closes-out" apology letter template 286' of FIG. 11, the apology letter template 286' will again be presented for selection in attach letter window 280 as shown in FIG. 12. Now that apology letter template 286' has been personalized, the user may now select attach 290 icon using pointer 202. In this manner, the contact's identifying information will be integrated into apology letter template 286' without having to manually type in the contact's information. Furthermore, since apology letter template 286' was previously personalized, the user can rest assured that the generated letter contains appropriate communicating information.

Figure 13:
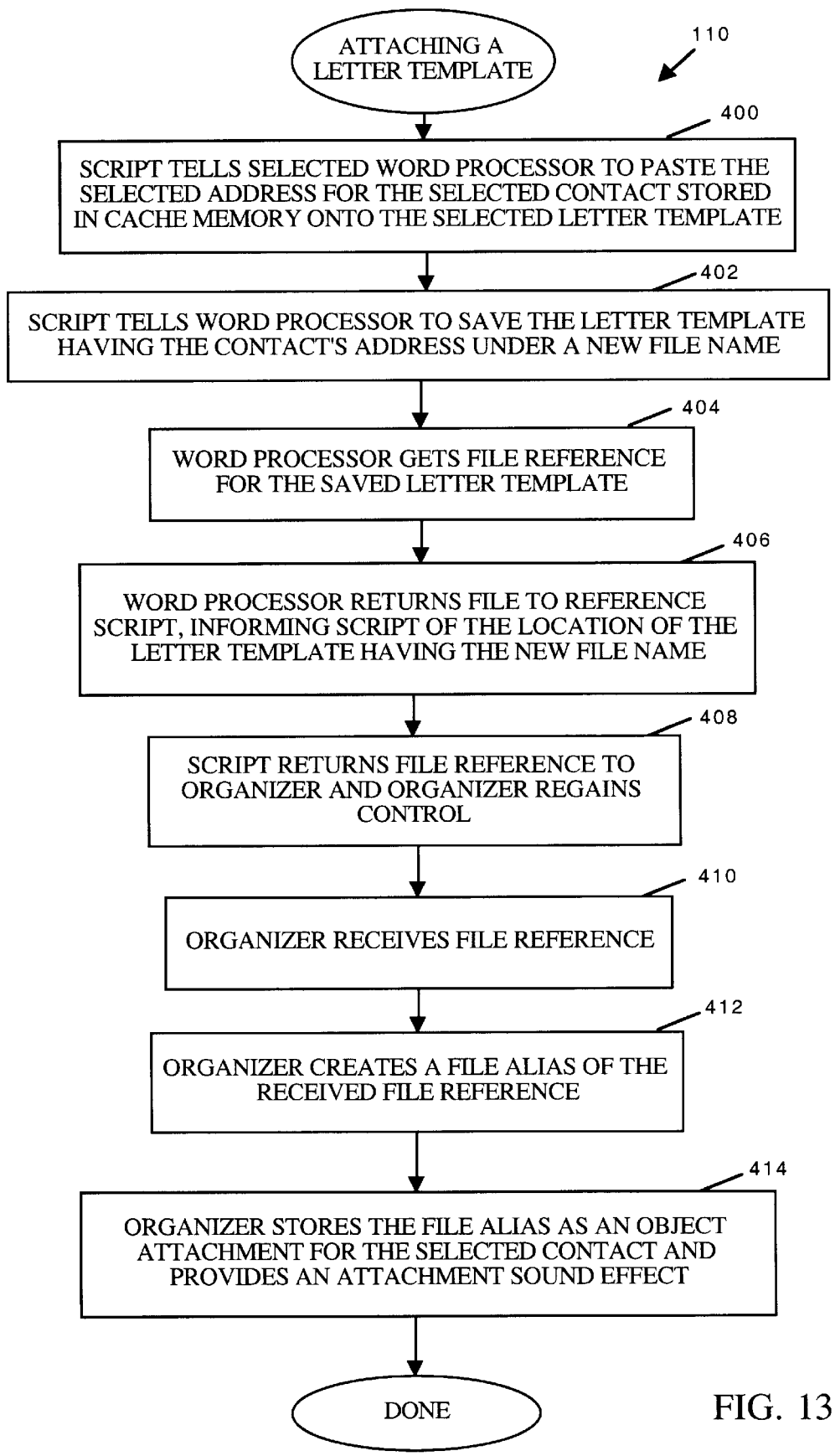
FIG. 13 is a flowchart diagram illustrating the method operations associated with attaching a letter template in accordance with one embodiment of the present invention.

FIG. 13 is a flowchart diagram illustrating the method operations associated with attaching a letter template as described in operation 110 of FIG. 1. The method for attaching a letter template begins at an operation 400 where a script tells a selected word processor to paste a selected address for a selected contact's identifying information onto a selected letter. As mentioned above, the contact's identifying information is preferably stored in temporary memory such as an operating system clipboard, cache memory or a disk drive. As described with reference to FIG. 5, the selected address for contact Mr. Copley is work address 210, which has been stored in temporary memory. The method now proceeds to an operation 402 where the script tells the word processor to save the letter template having the contact's address under a new file name.

Figure 14:
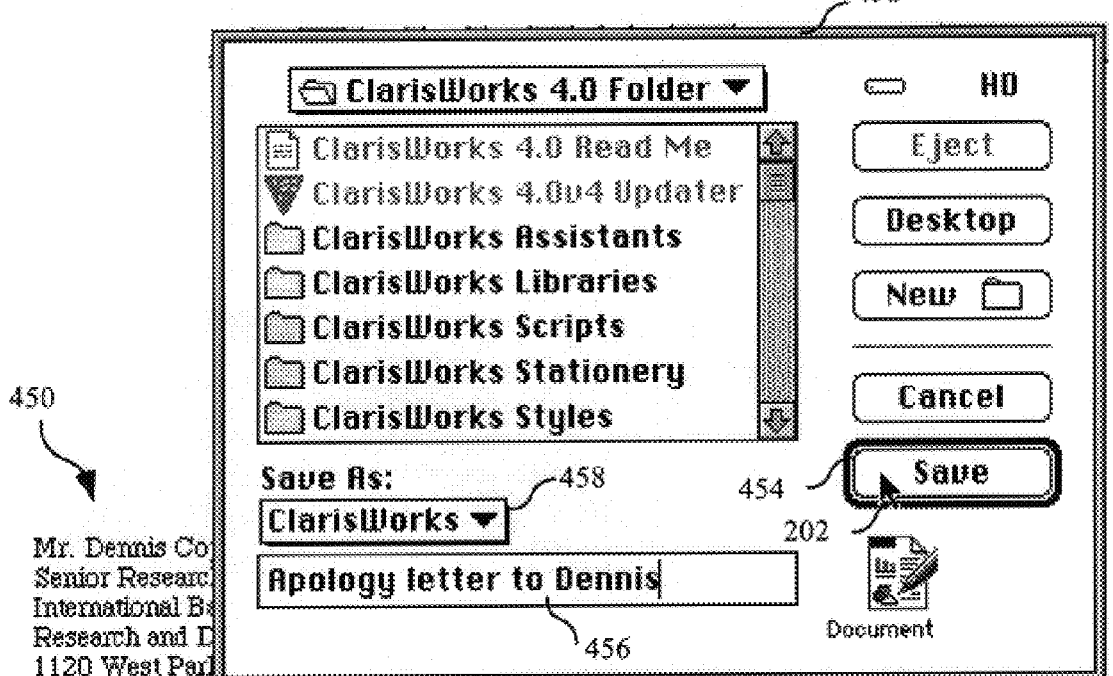
FIG. 14 shows a saving window used to prompt the user to save the current document in accordance with one embodiment of the present invention.

As shown in FIG. 14, a saving window 452 is shown prompting the user to save the current document under a new name. In this example, the user saved the current document and named it "Apology letter to Dennis" 456, and the document was saved as a ClarisWorks document 458. Of course, the document may be saved in any suitable format to allow various commercially available applications compatibility. Once the user appropriately saves and names the new letter, the user may select a save button 454 using an appropriate pointer 202. As further shown in FIG. 14, Mr. Copley's appropriate address and greeting has now been integrated into the apology letter template 286' that had been previously personalized.

Reference is again drawn to FIG. 13 where the method proceeds to an operation 404 where the selected word processor gets a file reference for the saved letter template. Once the word processor obtains the appropriate file reference for the saved letter template, the method proceeds to an operation 406 where the word processor returns the file reference to the script. In this manner, the script is informed of the name and location of the letter template having the new file name. The method now proceeds to an operation 408 where the script returns the file reference to an organizer program, and the organizer program once again regains control.

Once the organizer program has control, the method then proceeds to an operation 410 where the organizer program receives the file reference from the script. Once the organizer program has the file reference, the method proceeds to an operation 412 where the organizer program creates a file alias of the received file reference. In this manner, the organizer program may provide a link to the saved documents through attachment icon 213 of contact data card 200 as described with reference to FIG. 4. The method now proceeds to an operation 414 where the organizer program stores the file alias as an object attachment for the selected contact and provides an attachment sound effect.

By way of example, once the apology letter to Dennis 456 is saved as shown in FIG. 14, a letter of FIG. 15 is displayed to the user, and a sound effect resembling a "staple" is produced to notify the user that the apology letter to Dennis 456 has been attached to Mr. Copley's contact card. Although the sound effect is optional, the sound effect provides a convenient way for the user to determine whether the attachment process was indeed successful.

As shown in FIG. 15, the apology letter to Dennis 456 now contains Mr. Copley's identifying information 458, a greeting 460, and signature block 434. At this point, the user may print out the apology letter to Dennis without ever having to manually type in Mr. Copley's identifying information. Preparing standard or custom correspondence to contacts of an organizer program is therefore substantially more efficient than conventional methods. Furthermore, any correspondence made using the attach feature of this invention is advantageously linked to the contact's data card 200 of FIG. 4.

Figure 16:
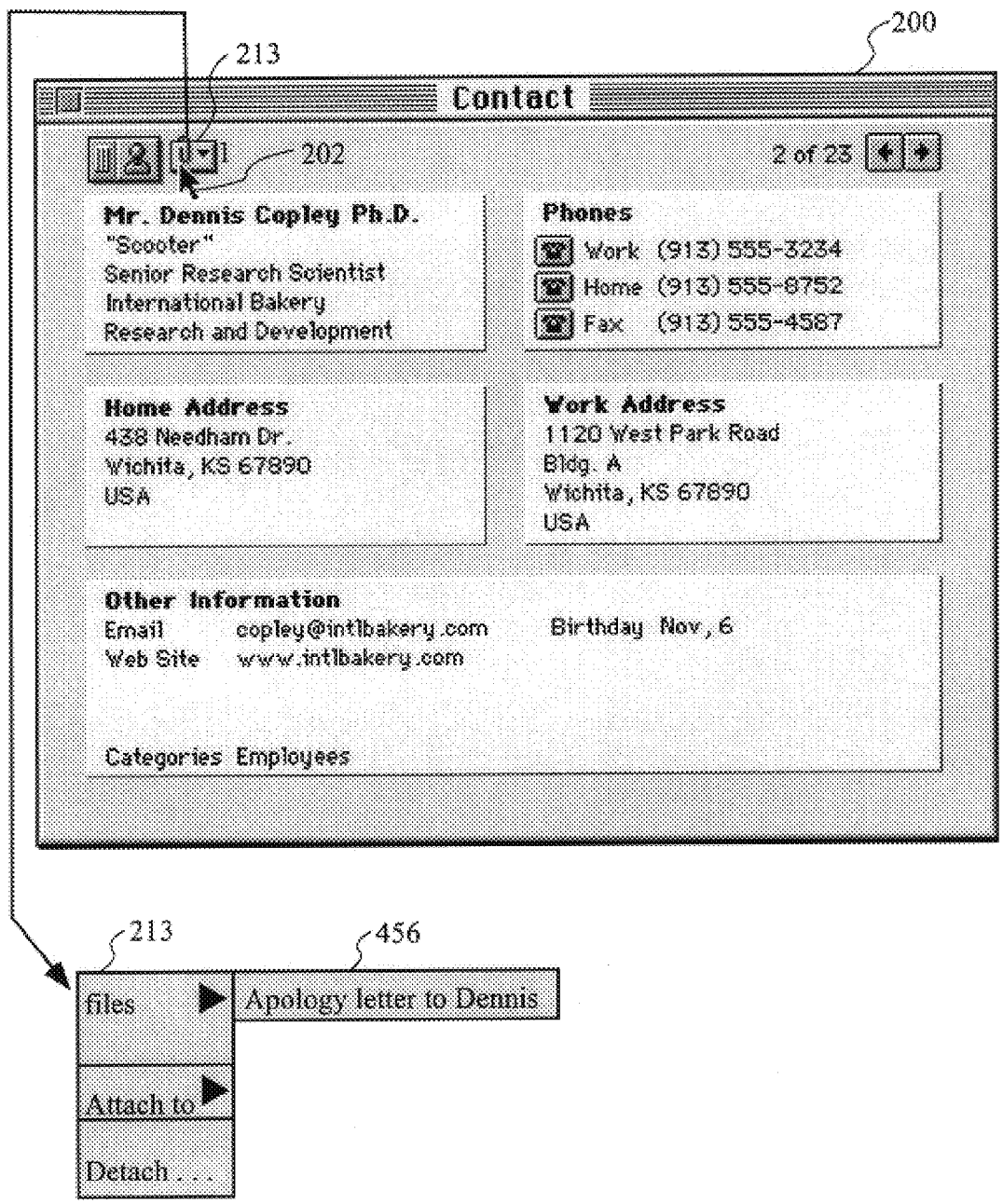
FIG. 16 shows a contact data card after an exemplary apology letter has been prepared using an attachment feature in accordance with one embodiment of the present invention.

FIG. 16 shows Mr. Copley's contact data card 200 after the apology letter to Dennis 456 has been prepared using the attach 290 icon of FIG. 12. Particular attention is drawn to attachment icon 213 which has a "1" signifying that there is "one" attachment for Mr. Copley. That is, at least one attachment has been prepared using attach letter icon 260 of FIG. 6. Advantageously, the user of the organizer program can link to and retrieve any document files attached to the contacts data card 200 without having to quit out of the organizer program. Furthermore, linking to the document files makes it substantially more efficient to determining whether correspondence has or has not been sent to a selected contact without having to time consumingly search computer hard drives, floppy disks, and paper files.

Therefore, once attachment icon 213 is selected, the user may select "files" which identifies the attached document. As shown, the attached document file is the apology letter to Dennis 456. However, it should be understood that any number of document files may be attached to Mr. Copley's contact card 200, which would therefore show other document files listed under the Apology letter to Dennis 456. Of course, each of the listed letters would also conveniently provide a link for accessing the document files without leaving the organizer program.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 17:
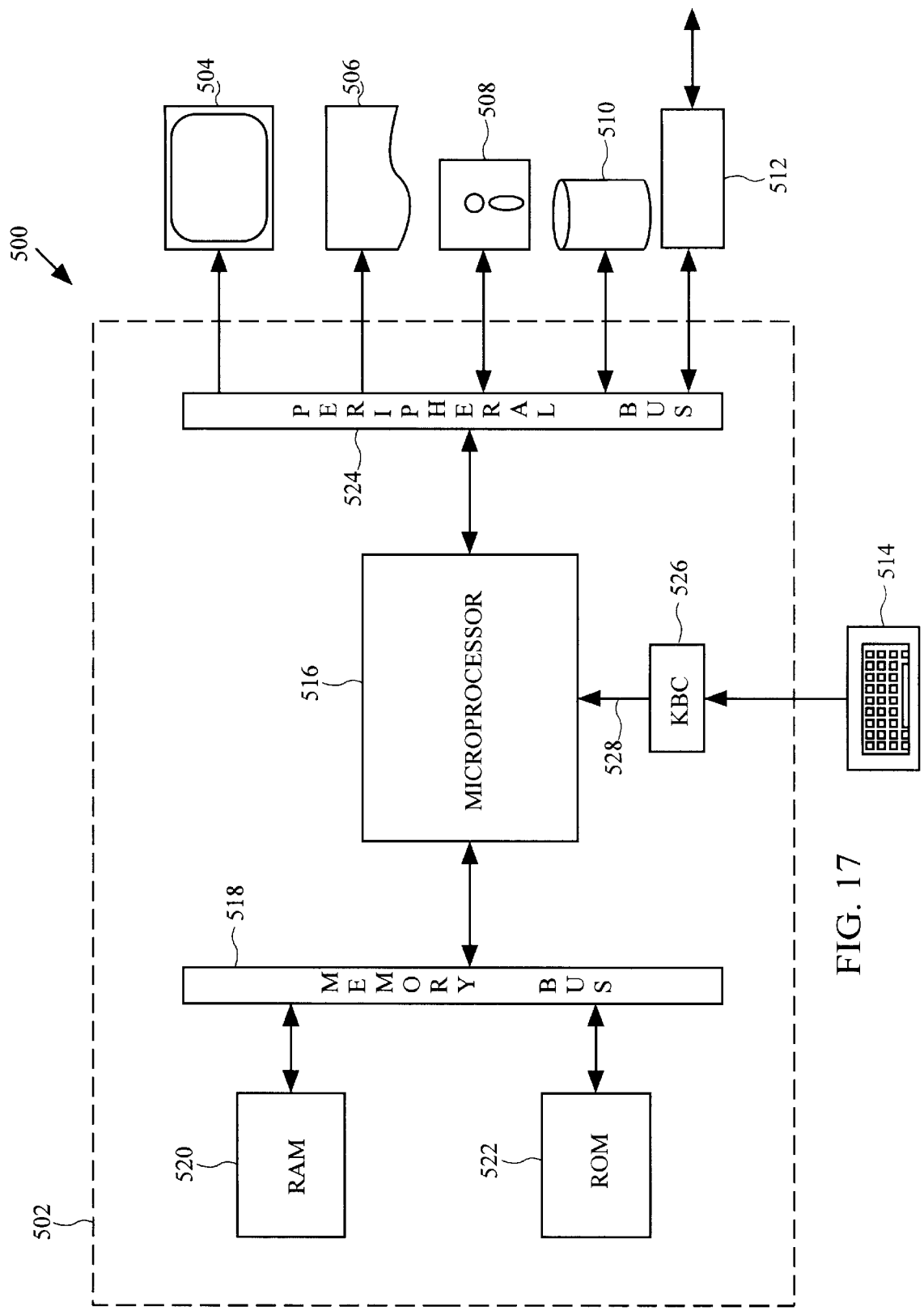
FIG. 17 is a block diagram of an exemplary computer system for carrying out the processing according to the invention.

FIG. 17 is a block diagram of an exemplary computer system 500 for carrying out the processing according to the invention. The computer system 500 includes a digital computer 502, a display screen (or monitor) 504, a printer 506, a floppy disk drive 508, a hard disk drive 510, a network interface 512, and a keyboard 514. The digital computer 502 includes a microprocessor 516, a memory bus 518, random access memory (RAM) 520, read only memory (ROM) 522, a peripheral bus 524, and a keyboard controller 526. The digital computer 500 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 516 is a general purpose digital processor which controls the operation of the computer system 500. The microprocessor 516 can be a single-chip processor or can be implemented with multiple components. Using instructions retrieved from memory, the microprocessor 516 controls the reception and manipulation of input data and the output and display of data on output devices. According to the invention, a particular function of microprocessor 516 is to assist in the processing of generating and linking documents to contacts of a personal organizer.

The memory bus 518 is used by the microprocessor 516 to access the RAM 520 and the ROM 522. The RAM 520 is used by the microprocessor 516 as a general storage area and as scratch-pad memory, and can also be used to store input data and processed data. The ROM 522 can be used to store instructions or program code followed by the microprocessor 516 as well as other data.

The peripheral bus 524 is used to access the input, output, and storage devices used by the digital computer 502. In the described embodiment, these devices include the display screen 504, the printer device 506, the floppy disk drive 508, the hard disk drive 510, and the network interface 512. The keyboard controller 526 is used to receive input from keyboard 514 and send decoded symbols for each pressed key to microprocessor 516 over bus 528.

The display screen 504 is an output device that displays images of data provided by the microprocessor 516 via the peripheral bus 524 or provided by other components in the computer system 500. The printer device 506 when operating as a printer provides an image on a sheet of paper or a similar surface. Other output devices such as a plotter, typesetter, etc. can be used in place of, or in addition to, the printer device 506.

The floppy disk drive 508 and the hard disk drive 510 can be used to store various types of data. The floppy disk drive 508 facilitates transporting such data to other computer systems, and hard disk drive 510 permits fast access to large amounts of stored data.

The microprocessor 516 together with an operating system operate to execute computer code and produce and use data. The computer code and data may reside on the RAM 520, the ROM 522, or the hard disk drive 520. The computer code and data could also reside on a removable program medium and loaded or installed onto the computer system 500 when needed. Removable program mediums include, for example, CD-ROM, PC-CARD, floppy disk and magnetic tape.

The network interface 512 is used to send and receive data over a network connected to other computer systems. An interface card or similar device and appropriate software implemented by the microprocessor 516 can be used to connect the computer system 500 to an existing network and transfer data according to standard protocols.

The keyboard 514 is used by a user to input commands and other instructions to the computer system 500. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Broadly speaking, the operations described above may be practiced using any suitable organizer-type programs and commercially available word processing programs.

Further, organizer and word processor documents may be stored and retrieved from any suitable storage medium. By way of example, such storage mediums may include a disk drive, a hard drive, a floppy disk, a server computer, a remotely networked computer, etc. Accordingly, the present embodiments are to be considered as illustrative and not restrictive, and the invention is not to be limited to the details given herein, but may be modified within the scope and equivalents of the appended claims.

What is claimed is:

1. A method for attaching a letter to a contact in a personal organizer contact list, comprising the operations of:

selecting a contact from the personal organizer contact list that is controlled by a personal organizer program, the personal organizer program being equipped to store and keep track of identifying information associated with a user's personal and business contacts;

storing a plurality of identifying information associated with the selected contact into a temporary memory location;

selecting a letter from a plurality of standard letters;

passing control to a script program configured to launch a word processor program for the letter selected from the plurality of standard letters, the script program instructing an operating system to launch the word processor program, and the script program being further configured to fetch the letter selected from the plurality of standard letters;

integrating the plurality of identifying information associated with the selected contact into the selected letter, wherein the integrating of the plurality of identifying information associated with the selected contact is initiated when the script tells the word processor to paste the plurality of identifying information stored in the temporary memory onto the letter selected from the plurality of standard letters, wherein the script tells the word processor to save the letter selected from the plurality of standard letters under a new file name, and to assign the new file name a file reference, and wherein the script further returns the file reference to the personal organizer program; and providing an attachment symbol on the selected contact of the personal organizer contact list, the attachment symbol indicating a number of attachments associated with the selected contact by providing an indicator of the number of attachments associated with the selected contact, the indicator being provided on the selected contact integral with or proximate to the attachment symbol, the letter being one of the number of attachments.

2. A method for attaching a letter to a contact as recited in claim 1, wherein the personal organizer program receives the file reference and creates a file alias for the received file reference.

3. A method for attaching a letter to a contact as recited in claim 1, wherein the personal organizer program stores the file alias as an object attachment associated with the selected contact so as to attach the selected letter to the selected contact.

4. A method for attaching a letter to a contact as recited in claim 3, wherein the object attachment is visually represented by the attachment symbol on a graphical user interface.

5. A method for attaching a letter to a contact as recited in claim 1, wherein when the plurality of identifying information associated with the selected contact is integrated into the selected letter, a sound effect is provided to indicate that the selected contact is integrated into the selected letter.

6. A method for attaching a letter to a contact as recited in claim 5, wherein the selected letter having the plurality of identifying information is invoked after being integrated.

7. A method for linking a letter to a contact, comprising:

generating a letter having a selected address type copied from data fields of a selected contact of a personal organizer contact list that includes a plurality of contacts, each of the plurality of contacts having a plurality of address types, the letter being generated by a separate word processor program that is called by a personal organizer program containing the personal organizer contact list, the personal organizer program being equipped to store and keep track of identifying information associated with a user's personal and business contacts;

saving the letter having the selected address type using the word processor, the word processor being configured to get a file reference for the saved letter and provide the file reference to the personal organizer program, the personal organizer program being configured to generate a file alias for the file reference;

associating the file alias with the selected contact of the personal organizer contact list;

providing an attachment symbol on the selected contact of the personal organizer contact list, the attachment symbol indicating a number of attachments associated with the selected contact by providing an indicator of the number of attachments associated with the selected contact, the indicator being provided on the selected contact integral with or proximate to the attachment symbol, the letter being one of the number of attachments; and providing a link to the number of attachments associated with the selected contact, the link being established through the file alias.

8. A method for linking a letter to a contact as recited in claim 7, wherein the selected address type is selected from the group consisting of a work address type, a home address type, a school address type, a business address type, and a user defined address type.

9. A method for linking a letter to a contact as recited in claim 7, wherein the data fields include identifying information selected from the group consisting of a contact name, a phone number, an e-mail address, a website address, and a birthdate.

10. A method for linking a letter to a contact as recited in claim 7, wherein the indicator provides a link for accessing each of the number of attachments.

11. A method for linking a letter to a contact as recited in claim 10, further comprising the operations of:

implementing a script program configured to tell an operating system to launch the separate word processor for generating the letter when the personal organizer calls the word processor program.

12. A method for linking a letter to a contact as recited in claim 7, wherein the attachment symbol is a pull-down menu that contains a linking entry for each of the attachments associated with the contact.

13. A method for linking a letter to a contact as recited in claim 10, wherein the attachment symbol is a pull-down menu that contains a linking entry for each of the attachments associated with the contact.

* * * * *